United States Patent
Delong et al.

(10) Patent No.: US 7,844,113 B2
(45) Date of Patent: Nov. 30, 2010

(54) REGION BASED PUSH-RELABEL ALGORITHM FOR EFFICIENT COMPUTATION OF MAXIMUM FLOW

(75) Inventors: Andrew Delong, London (CA); Yuri Boykov, London (CA); Daphne Yu, Yardley, PA (US)

(73) Assignees: Siemens Medical Solutions USA, Inc., Malvern, PA (US); The University of Western Ontario, London, Ontario (CA)

( * ) Notice: Subject to any disclaimer, the term of this patent is extended or adjusted under 35 U.S.C. 154(b) by 916 days.

(21) Appl. No.: 11/685,815

(22) Filed: Mar. 14, 2007

(65) Prior Publication Data

US 2007/0286483 A1    Dec. 13, 2007

Related U.S. Application Data

(60) Provisional application No. 60/789,342, filed on Apr. 5, 2006.

(51) Int. Cl.
*G06K 9/34* (2006.01)
(52) U.S. Cl. .................................... 382/173
(58) Field of Classification Search .................... None
See application file for complete search history.

(56) References Cited

U.S. PATENT DOCUMENTS

| | | | | |
|---|---|---|---|---|
| 6,973,212 B2 * | 12/2005 | Boykov et al. | ............... | 382/173 |
| 7,444,019 B2 * | 10/2008 | Boykov et al. | ............... | 382/173 |
| 7,536,050 B2 * | 5/2009 | Boykov et al. | ............... | 382/173 |
| 2006/0029275 A1 * | 2/2006 | Li et al. | ............... | 382/173 |

OTHER PUBLICATIONS

TopCoder Algorithm Tutorials "Maximum Flow" article, obtained at http://www.topcoder.com/tc?module=Static&d1=tutorials &d2=maxFlow, part 1 of 2, 11 pages, Jan. 18, 2007.
TopCoder Algorithm Tutorials "Maximum Flow" article, obtained at http://www.topcoder.com/tc?module=Static&d1=tutorials &d2=maxFlow2, part 2 of 2, 15 pages, Jan. 18, 2007.
Cherkassky and Goldberg "On Implementing Push-Relabel Method for the Maximum Flow Problem" publication, 18 pages, Sep. 1994.

* cited by examiner

*Primary Examiner*—Yuzhen Ge
(74) *Attorney, Agent, or Firm*—Donald B. Paschburg

(57) ABSTRACT

A region-based push-relabel formulation is disclosed that removes the requirement that the entire graph should fit into the computer memory and yields an implementation that can reduce the required size and redundancy of accesses to the data memory, thus improving speed performance, while allowing for an efficient parallel processing implementation. The algorithm assigns all vertices that are not part of the sources or sinks with a value of 1. Sinks are assigned with zeros and sources are assigned a label equal to the number of their vertices. The preflow is then pushed from the sources to their neighbors, if any. When the preflow has all reached the boundaries, an adjacent region of the neighboring set is selected and preflow is pushed within this region. When the values of the preflow have been exhausted, region relabeling is done to update the label values. This is repeated within the region until all preflow has exited to the boundary of this region. The operation is then repeated for the neighboring regions that now contain the preflow. Regions which have no preflow may be skipped, thereby realizing a savings in processing resources.

31 Claims, 4 Drawing Sheets

(a) choose $\mathcal{R}$; insert $\mathcal{B} = \{a, b, j\}$ into $\mathcal{Q}$ (b) pull $\{j\}$, insert $\{g\}$ (c) pull $\{h, b\}$, insert $\{e, i\}$ (d) pull $\{i, e, a\}$, insert $\{d, f\}$ (e) pull $\{f, d\}$, insert $\{\}$ (f) final labels

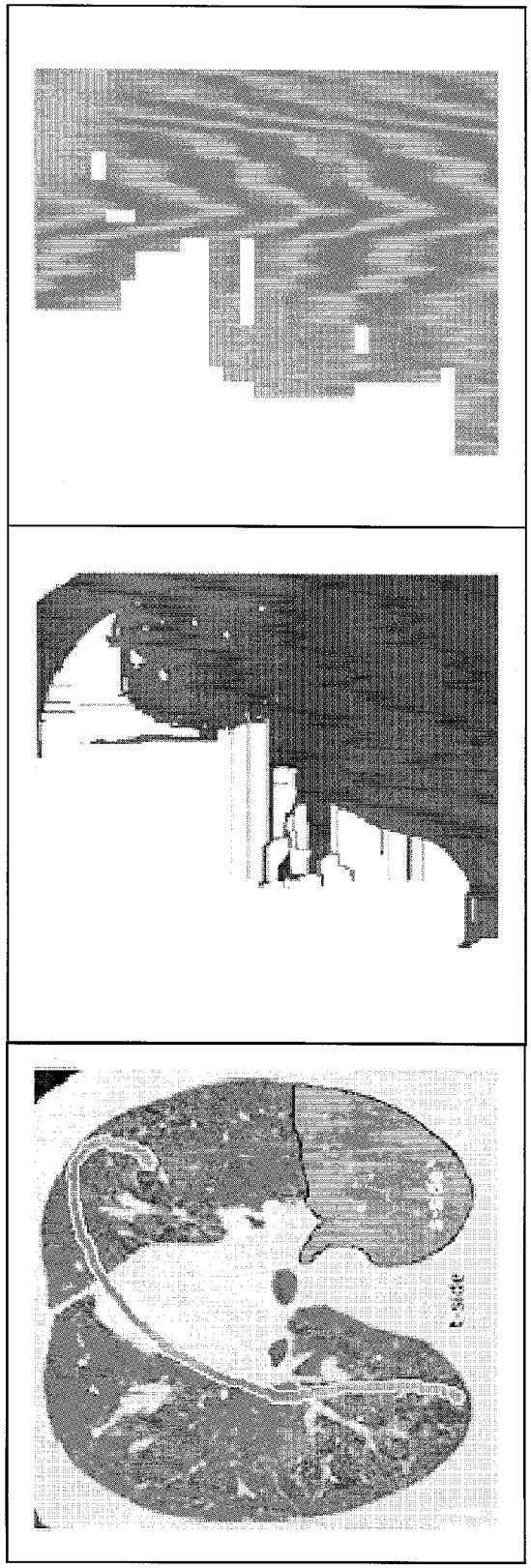

US 7,844,113 B2

REGION BASED PUSH-RELABEL ALGORITHM FOR EFFICIENT COMPUTATION OF MAXIMUM FLOW

REFERENCE TO RELATED APPLICATIONS

This application claims the benefit of the filing date under 35 U.S.C. §119(e) of U.S. Provisional Application Ser. No. 60/789,342 filed Apr. 5, 2006, which is hereby incorporated by reference.

BACKGROUND

Maximum flow relates to the problem of finding the maximum flow between sets of vertices in a directed graph. In one application, graphs may be used to model real world systems or designs and maximum flow may be used to determine or simulate operational characteristics of that application or design. A path is a list of vertices of a graph where each vertex has an edge, i.e. a connection between two vertices, from it to the next vertex. A weighted directed graph is a directed graph that has a weight, i.e. a numeric value, associated with each edge that may relate to the carrying capacity of the edge, e.g. the maximum flow that may be sent through the edge or vertex, as dictated by the application or design being modeled. A flow network is a weighted directed graph with two sets of specially marked nodes, the source "s" and the sink "t," and a capacity function that maps edges to positive real numbers. A source is a vertex of a directed graph with no incoming edges and may represent a producer of data in an application or design. A sink is vertex of a directed graph with no outgoing edges and may represent a consumer of data in an application or design.

Applications of weighted directed graphs and maximum flow include modeling and analyzing shipping systems, airline scheduling systems, open pit mining operations, etc. Another application of maximum flow is image segmentation.

In image analysis, segmentation is the partitioning of a digital image into multiple regions (sets of pixels), according to a given criterion. The goal of segmentation is typically to locate objects of interest and is sometimes considered a computer vision problem. Unfortunately, many segmentation methods that are based only on local pixel information, and hence scalable for large graphs, are too simple to solve most problems. Other more advanced segmentation methods such as the traditional maximum flow method or model based method, provide the capability to segment based on information from a large capture range, but suffer from severe practical limitations for large graphs due to their large memory requirement and iterative traversal pattern. Many important segmentation algorithms are too simple to solve this problem accurately, compensating for this limitation with their predictability, generality, and efficiency.

Local Pixel Based Segmentation

A simple example of this kind of segmentation is thresholding a grayscale image with a fixed threshold t: each pixel p is assigned to one of two classes, P0 or P1, depending on whether $I(p)<t$ or $I(p) \geqq t$. Threshold techniques, which make decisions based on local pixel information, are effective when the intensity levels of the objects fall squarely outside the range of levels in the background. When this assumption is not true, however, which is the case in most real world problems, the result is seldom acceptable.

Traditional maximum flow segmentation method can be applied on a down sampled version of a large graph. In fact, this is often the practice where maximum flow segmentation is needed on large graphs. This, however, does not yield a high quality segmentation results as information is lost in the process of re-sampling the large graph to a smaller version of it.

Accordingly, an effective, scalable, and efficient maximum flow segmentation method is needed.

BRIEF DESCRIPTION OF THE DRAWINGS

FIG. 4A shows the visualization of vertices actually visited by the region-based push-relabel algorithm of the disclosed embodiments while segmenting an image of a human lung.

FIG. 4B shows a highlighted region of the visualization of FIG. 4A denoting the subset of vertices that relayed preflow.

FIG. 4C shows a highlighted region of the visualization of FIG. 4A denoting how region relabeling would allow one to only allocate and initialize the portion of the graph if our graph was divided into a coarse grid.

DETAILED DESCRIPTION OF THE DRAWINGS AND PRESENTLY PREFERRED EMBODIMENTS

Figure 1:
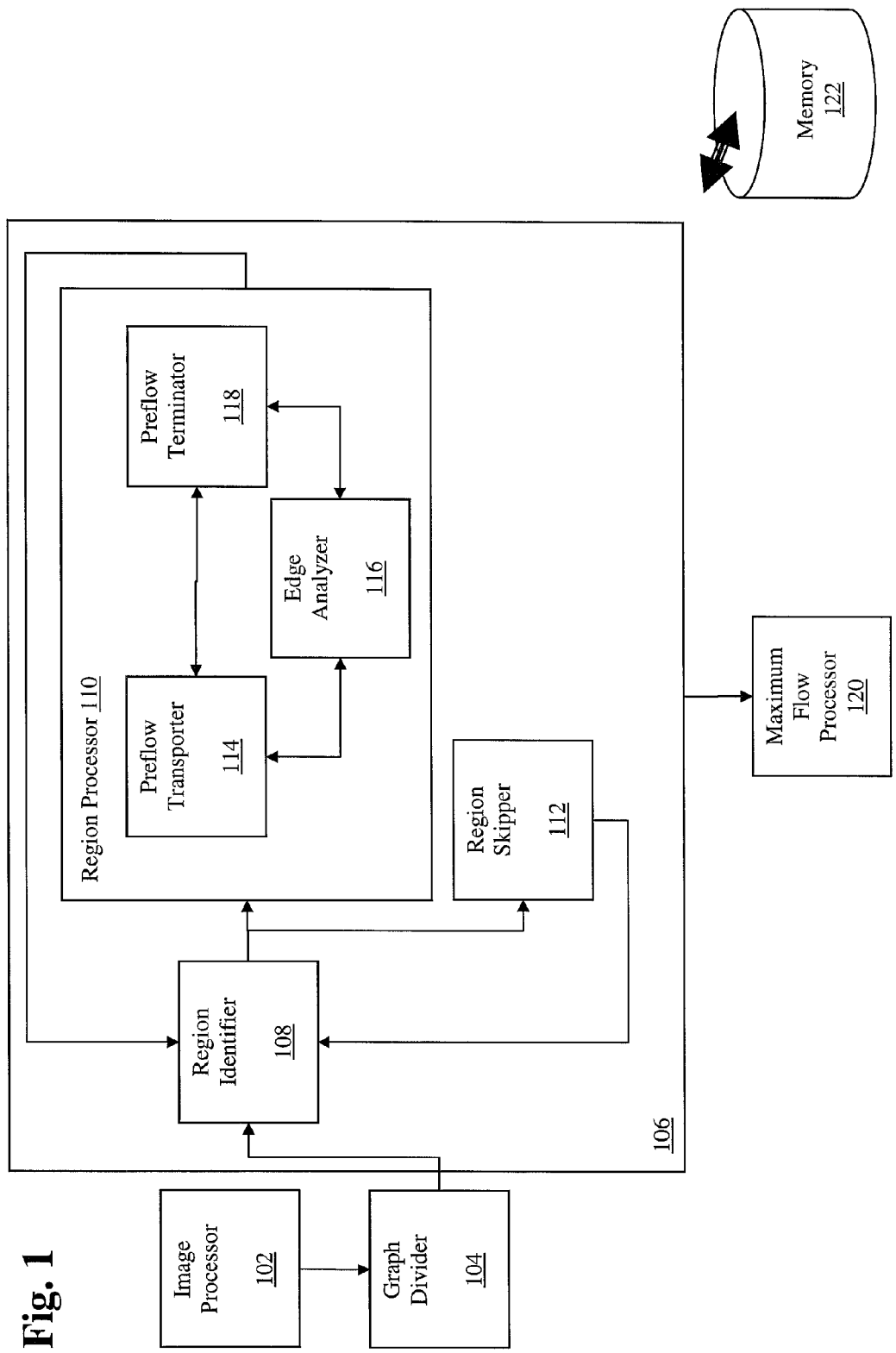
FIG. 1 depicts a block diagram of a system for computing maximum flow according to one embodiment.

Computing the maximum flow on a graph has long been an important segmentation method for operations research, and has recently found applications in segmentation of images, including large multidimensional (N-D) biomedical images. The push-relabel technique had been known in the art for solving the maximum flow problem. Despite giving high quality results, the traditional push-relabel techniques often require that the entire graph to be randomly accessed many times and therefore these techniques perform very poorly, if at all possible, for large N-D graphs where the data may not fit into a conventional computer cache, physical memory or even into the virtual address space. The disclosed embodiments relate to a novel region-based push-relabel formulation that removes the requirement that the entire graph should fit into the computer memory, and may further reduce the amount of memory required. This region based method is superior to prior push-relabeling methods for large graphs in that it yields an implementation that can reduce the required size and redundancy of accesses to the data memory, thus improving speed performance. In addition, the region based method allows for an efficient parallel processing implementation that can take advantage of systems with multiple processors.

The goal of maximum flow is to transport as much flow, from a user specified set of sources s to a set of sinks t, as possible, subject to the constraint that each edge along the way has an upper bound on the amount of flow permitted to cross it. As noted above, a source is a vertex of a directed graph with no incoming edges and a sink is vertex of a directed graph with no outgoing edges, for at least the purposes of a particular analysis or iteration thereof, e.g. a set of vertices may be compartmentalized for analysis by assuming that given vertices are sources and sinks, i.e. assuming those particular vertices have no incoming or outgoing edges which connect the set of vertices with another set of vertices. Flow is sent in packets called preflow. In a push-relabel method for computing maximum flow, the push step is the process of transporting preflow between neighboring vertices, and relabeling is a means of determining in what direction preflow should be pushed. Vertices in the graph must be continually relabeled because, as preflow advances through the graph, edges can become saturated, i.e. the maximum capacity is reached, thus changing the ideal direction(s) in which subsequent preflow should travel.

There are two major methods known in the art for relabeling vertices of a graph. The most straightforward relabeling method is to recalculate all of the direction of flow for all of the vertices through an operation called global relabeling. Global relabeling requires that the exact distance for every vertex to the sink(s) be accurately computed each time an edge becomes saturated. Because all non-saturated edges are treated as having a distance 1, global relabeling takes $O(|\epsilon|)$ time where $\epsilon$ is the set of all edges in the graph. For graphs of even moderate size, global relabeling may be too expensive, e.g. resource intensive, to perform every time an edge becomes saturated.

Another approach to updating labels is local relabeling, so named because the label that the method assigns to a vertex is based purely on local information (i.e. immediate neighbor vertices and their labels). From the viewpoint of each preflow, local relabeling is akin to navigating a maze with one's eyes shut. Although local relabeling is guaranteed to eventually correct the labels enough to proceed, preflow throughout the graph using this relabeling method often makes seemingly redundant moves that visually resemble Brownian motion. Besides being computationally suboptimal, for large N-D graphs, this type of motion is highly prohibitive since redundant random access of a large graph is exceedingly slow. Since a typical computer memory is paged as, e.g. logically sub-divided into, blocks of at least thousands of bytes, the random access of several bytes at a time, due to the nature of the local relabeling method, typically fails to yield to efficient memory management schemes, such as management schemes which rely on an assumed temporal and/or spatial locality of data accesses. In practice, the best performance is usually achieved when both global and local relabeling are used together in a heuristic manner as in B. V. Cherkassky, A. V. Goldberg, On Implementing Push-Relabel Method for the Maximum Flow Problem, Algorithmica, 19:390-410, 1994, herein incorporated by reference. This heuristic, however, does not help with large N-D graphs since memory limitations may prevent any application of global relabeling.

The disclosed embodiments provide new insight to the relabeling problem by formulating a region relabeling method. This region relabeling method is incorporated into a novel region-based push-relabel method for computing maximum flow for large graphs, such as large N-D graphs. The main benefit of this method is that its regional processing nature does not require that the entire graph to be accessible in a computer memory for its operation. Accordingly, a large memory space is unnecessary. In addition, unlike global relabeling methods, not all nodes in the graph are necessarily visited in order to reach the maximum flow solution, as will be described in more detail below. The result is that some regions of the large graph may be skipped entirely without affecting the final solution, thus implicitly reducing the effective graph size. Also, in contrast to local relabeling, the assignment of labels in region relabeling to a vertex is not solely based on its immediate neighbors; thus, the amount of redundant movements in the graph is less than the amount made solely using local relabeling. The result of this new region-based push-relabel method is a possibility to operate on large N-D graphs while still retaining computational efficiency by reducing redundant movements.

The region relabeling operation on a graph $G=\langle V,E \rangle$, where $\langle V,E \rangle$ is the set of vertices and edges, can be described by the following steps:

1) Choose any region $R \subseteq V\setminus\{s,t\}$ of the graph G, where s and t are the source and targets, respectively;
2) Define the boundary set $B=\{b \in V\setminus R | (r,b) \in E, r \in R\}$ of vertices and edges which encloses region R;
3) Build a priority queue Q from the set B based on the labels of the vertices of set B, with low labels indicating high priority, to set the order of regions to be traversed; and
4) Relabel R, based on the shortest distance from each source to each sink, using Q to control the breadth-first search.

In graph theory, the single-source shortest path problem is the problem of finding a path between two vertices such that the sum of the weights of its constituent edges is minimized. Any suitable shortest-path algorithm for computing the shortest path in an edge-weighted graph G, with start vertex and end vertex t, may be used, such as a breadth-first search or Dijkstra's algorithm. Breadth-first search (BFS) is a graph search algorithm that begins at the root node and explores all the neighboring nodes. Then for each of those nearest nodes, it explores their unexplored neighbor nodes, and so on, until it finds the goal. Consider the problem of image segmentation, such as separating two characters in a scanned, bit-mapped image of printed text. The separating line between two points that cuts through the fewest number of black pixels is determined. This grid of pixels can be modeled as a graph, with any edge across a black pixel given a high cost. The shortest path from top to bottom defines the best separation between left and right.

The above steps can be thought of as fixing the labels of vertices in B, and then performing an inward global relabel on R starting from the vertices in B with the lowest label, i.e. relabel each vertex within the region starting from the region boundary. Only vertices in R∪B, i.e. the vertices within the region R and the boundary set B, are required by this operation—the rest are ignored. The priority queue is important because, unlike traditional global relabeling, the fixed vertices in B can begin with any labels, but the shortest-path algorithm must incorporate those vertices as it assigns higher and higher labels within R. Without incorporating these pending boundary nodes, region relabeling could otherwise assign labels which are too high thereby misleading preflow into skipping some relevant paths. If preflow does not search the entire relevant space, then the flow will not be a maximum. Refer to FIG. 3, described below, which shows an example of the relabeling process.

From the above region relabeling formulation, one can actually express the traditional local and global relabeling as extreme subsets of region relabeling as follows:

Global relabel: Set $R=V\setminus\{s,t\}$. It follows that $B=\{s,t\}$ with s and t having fixed labels $|V|$ and 0 respectively.

Local Relabel of a vertex v: Let d(v) denote the label of v and $N(v)=\{w \in V | (v,w) \in E\}$ (i.e. neighbors of v). Local relabeling is traditionally defined by assigning new d(v) as follows:

$$d(v) = \min_{w \in N(v)} d(w) + 1 \qquad (1)$$

To redefine local relabeling, we simply set $R=\{v\}$. It follows that $B=N(v)$, and the resulting shortest-path algorithm is exactly equivalent to formula (1), above, since the first neighbor to be pulled from the priority queue, Q, will have the lowest label of all N(v). This supports that region relabeling is actually a generalized formulation of the traditional global and local relabeling. However, it is important to note that, without the insight of this generalization, and the introduction of the priority queue to set the order in which regions are traversed in step 3) and 4) of the region based framework, efficient application to large N-D graph would either be impossible or highly inefficient.

Region relabeling is now introduced into the push-relabel framework as a region-based push relabel algorithm that leverages the region relabeling operation. Let A be all of the vertices in $V\backslash\{s,t\}$ that hold preflow at the given time. The strategy of the algorithm is to discharge all the preflow out of R by alternating between a pushing phase and a region relabeling operation. Once all preflow originally in R has been transported to the boundary vertices B (which may include s and t), then we select a new neighboring region having preflow and skip those regions with no preflow and so on. In one embodiment, the algorithm begins with a region R adjacent to the source(s) s (if there are multiple such regions, the selection of which region to start with may be arbitrary). The algorithm is as follows:

```
0    initialize d(v) = 1, ∀v ∈ V†{s,t}
1    initialize d(t) = 0,d(s) =|V|
2    initialize A = N(s)
3    push preflow from s to N(s)
4    while A ≠ ∅
5       choose R such that A ∩ R ≠ ∅
6       do
7          push all preflow in A ∩ R until the flow is exhausted
8          perform region relabel on R
9          update A to reflect new locations of preflow
10      while A ∩ R ≠ ∅
```

In other words, the algorithm starts by assigning all vertices that are not part of the sources or sinks with a value of 1. Sinks are assigned with zeros and sources are assigned a label equal to the number of their vertices. The preflow is then pushed from the sources to their neighbors, if any. When the preflow has all reached the boundaries, an adjacent region of the neighboring set is selected and preflow is pushed within this region. When the values of the preflow have been exhausted, region relabeling is done to update the label values. This is repeated within the region until all preflow has exited to the boundary of this region. The operation is then repeated for the neighboring regions that now contain the preflow. The selection of which neighboring region to process next is arbitrary, and may be based on the order in which the regions are stored in a memory or other basis, and will not affect the overall results as long as A∩R≠∅. Further, as noted elsewhere, multiple neighboring regions may be processed in parallel. Regions which have no preflow, i.e. A∩R=∅, may be skipped thereby realizing a savings in processing resources, as described herein.

Note that A does not include t or s so the algorithm terminates for the entire graph when all flow has either reached t or has eventually retreated back to s, thus meeting the requirement for maximum flow.

It will be apparent that, when the graph cannot fit into the computer memory, region relabeling can be applied where global relabeling cannot. An alternative application stems from an important observation: local relabeling finds a globally maximum flow without necessarily visiting every vertex in the graph. Push relabel achieves this in part because it is asymmetric in the sense that the terminal vertex t is treated as a passive receiver of flow rather than an active seeker of it. As a result, preflow must visit all vertices on the s-side of a minimum cut, i.e. the smallest set of edges in an undirected graph which separate two distinct vertices, but often only a small subset of vertices on the t-side (see FIG. 4B). Region relabeling will allow us to find the maximum flow more efficiently than local relabeling alone, yet still provides an opportunity to ignore much of the graph (see FIG. 4C). This ability is particularly valuable for biomedical segmentation when the area being segmented is often a small fraction of a huge 3D volume.

In its implementation, region relabeling allows us to organize the memory layout of the graph as individual units in the granularity of each spatially non-overlapping regions, each capable of independently pushing preflow and efficiently relabeling themselves. In a 3D volume, for example, the graph can be organized as an array of 3D rectangular bricks. The size of the brick can be selected based on the optimal memory cache size for the particular computer system to which the algorithm is to be deployed. In this way, the computation of the relabeling within each brick can be done efficiently without delays from loading and unloading of the computer cache memory, i.e. cache misses. For large graphs that do not fit into the computer main memory, the region relabeling can be implemented as an out of core algorithm, i.e. an algorithm which processes data that is too large to fit into a computer's main memory at one time. Such algorithms must be optimized to efficiently fetch and access data stored in slow bulk memory such as hard drive or tape drives. As long as each region is defined to be a subset of the large graph that still fits into the main memory, the memory used to store each region can be mapped and unmapped as it is being visited.

The region based push-relabel method also yields nicely to a parallel implementation for computer systems with multiple central processing units (CPUs). One or more regions can be processed by different CPU's for computation of the preflow and relabeling within each region. Since the memory layout of each region is nicely separated by design, reading and writing to multiple regions will not require any complex synchronization/coherency mechanism between each processing thread. Also, since there is control over the granularity with which the different regions that are being relabeled are synchronized, control of synchronization overhead in a parallel implementation of push relabel is also gained. With very coarse synchronization extremely large maximum flow problems may be solved in a distributed manner instead of relying on shared memory systems.

FIG. 1 depicts a block diagram of a system 100 for computing maximum flow according to one embodiment. The system 100 may be implemented in hardware, software or a combination thereof, such as logic stored in a memory and executable by one or more processors to achieve the disclosed functionality. Further, the system 100 may be implemented in one or more computers having suitable capabilities which may be loosely or tightly coupled, such as via a network. It will be appreciated that the component designations of the system 100 as described herein are for convenience and that the described functionality may be implemented in fewer or more components, depending upon the application. In one embodiment, the system 100 is implemented in a multiprocessor computing environment which takes advantage of the parallelization of region processing offered by the disclosed methodologies. It will be appreciated that the disclosed embodiments may operate on a computer system having a suitable memory architecture and that, if available, a storage architecture featuring a cache memory hierarchy, virtual memory architecture, or combination thereof, may be leveraged in a optimal fashion by the disclosed embodiments to avoid inefficient operations, such as excessive cache misses, excessive paging, excessive or unaligned read operations, the exceeding of cache, virtual or physical memory capacity, or combinations thereof.

The system 100 includes a graph divider 104, a graph processor 106 coupled with the graph divider 104 and a maximum flow processor 120 coupled with the graph processor 106. Herein, the phrase "coupled with" is defined to mean directly connected to or indirectly connected through one or more intermediate components. Such intermediate components may include both hardware and software based components. The graph processor 106 includes a region identifier 108, a region processor 110 coupled with the region identifier 108 and a region skipper 112 coupled with the region identifier 108. The region processor 100 further includes a pre-flow transporter 114, an edge analyzer 116 coupled with the pre-flow transporter 114 and a pre-flow terminator 118 coupled with both the pre-flow transporter 114 and edge analyzer 116. In one embodiment, the system 100 further includes an image processor 102 coupled with the graph divider 104.

The system 100 computes maximum flow for a graph, as was described above, where the graph comprises a plurality of vertices and at least one source vertex and at least one target vertex, and a plurality of edges therebetween, each of the plurality of edges being constrained by a maximum amount of flow that can be transported thereover, the graph being further characterized by a flow comprising a plurality of preflow. The graph may be representative of a multi-dimensional image, such as a multi-dimensional, e.g. two dimensional, three dimensional or four dimensional, biomedical image obtain from an imaging modality, e.g. ultrasound, magnetic resonance imaging, computed tomography, x-ray, etc. In one embodiment, the system 100 includes an image processor 102 which obtains a multi-dimensional image and derives the graph therefrom. The image processor 102 may be coupled with one or more of the aforementioned imaging modalities, or with another source of such images such as a storage archive, e.g. a picture archive communication system ("PACS"). It will be appreciated that the disclosed embodiments are not limited to the processing of biomedical images and may be used for other applications of image segmentation and/or maximum flow.

Regardless of how the graph is obtained or derived, it is provided to the graph divider 104 which is operative to divide the graph into a plurality of regions, each of the plurality of regions including a subset of the plurality of vertices, including a regional source vertex and a regional target vertex, and an associated subset of the plurality of edges. The subset of the plurality of vertices may include at least one boundary vertex which includes the regional source vertex, the regional target vertex, or a combination thereof. In one embodiment the graph divider 104 is coupled with the memory 122 of the computer on which the operations will be carried out and is further operative to determine a first amount of memory required to process the graph, determine a second amount of memory less than the first amount; and divide the graph into a plurality of regions, where each of the plurality of regions requires at most the second amount of memory for processing. For example, where the first amount of memory may exceed a physical memory space, virtual memory space, or combination thereof 122 of a computer comprising, executing or coupled with the graph divider 104, region identifier 108, region processor 110, region skipper 112, maximum flow processor 120, or combinations thereof, the second amount of memory is determined so as not to exceed the physical memory space, virtual memory space, or combination thereof 122 of the computer. In one embodiment, the second amount of memory is less than or equal to a page size, such as 512 kilobytes, block size, such as 128 kilobytes, or combination thereof of a storage architecture of the computer. In particular, the second amount of memory is ideally an amount of memory determined to be more computationally efficient than the first amount of memory.

The system 100 further includes a graph processor 106 coupled with the graph divider 104. The graph processor 106 includes a region identifier 108 which is operative to identify each region of the plurality of regions having at least a portion of the plurality of preflow. Regions identified as having at least a portion of the plurality of preflow are passed to the region processor 110 of the graph processor 106 while regions having no preflow are passed to the region skipper 112 of the graph processor 106. The region skipper 112 is coupled with the region identifier 108 and operative to ignore each region of the plurality of regions which have none of the plurality of preflow. Typically, identified regions being close to one of the source vertices of the graph are processed first and thereafter neighboring regions are processed, the order of which is not a dependency of the algorithm but which may be selected to based on efficiency, such as memory access efficiency where regions are stored in consecutively addressed memory spaces, as was discussed above. This advantageously saves processing resources from having to process regions, e.g. load into memory, examine vertices and edges, etc., when there is no need to do so, i.e. the computational result for maximum flow is not affected. The region processor 110 and region skipper 112 process all of the plurality of regions until each of the plurality of preflow has either been moved to the at least one source vertex or moved to the at least one target vertex. Once this occurs, the process is finished for the graph, e.g. all of the identified regions have been processed or skipped, and the maximum flow may be determined by the maximum flow processor 120. In one embodiment, the region processor 110 is further operative to process identified regions independently, such as in parallel, in separately allocated memory spaces, using separate processes, using separate processors, or combinations thereof.

The region processor 110 is coupled with the region identifier 108 and operative to, for each identified region and for all of the portion of the plurality of preflow and for all of the subset of the plurality of vertices of the identified region, process the identified region. Generally, the region processor 110 alternates between a pushing phase and a region relabel operation, as described above. In particular, the preflow transporter 114 transports the portion of the plurality of preflow between neighboring vertices of the subset of the plurality of vertices of the identified region via an edge of the subset of the plurality of edges of the identified region. The edge analyzer 116 determines a degree to which the edge is saturated and further determines, based on the degree of saturation of the edge, a direction in which subsequent preflow should be transported between the neighboring vertices via the edge. The preflow terminator 118 terminates the transport of preflow by the preflow transporter and determination of edge saturation and preflow direction by the edge analyzer when all of the portion of the plurality of preflow of the identified region has reached the regional target vertex of the identified region, retreated to the regional source vertex of the identified region, or a combination thereof.

Figure 2:
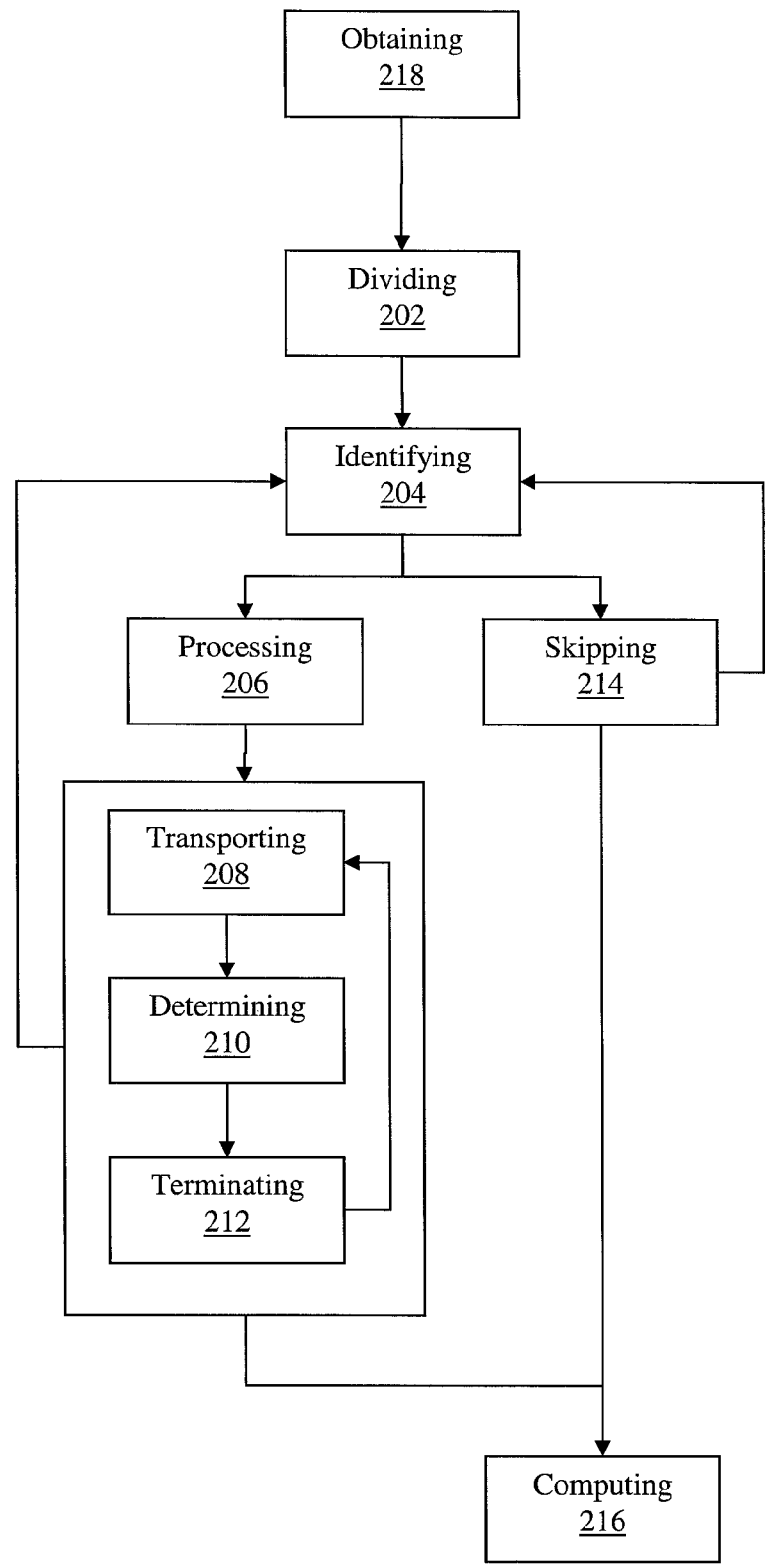
FIG. 2 is a flow chart showing the operations of the system of FIG. 1.

FIG. 2 is a flow chart showing the operations of the system of FIG. 1 for computing maximum flow of a graph, the graph comprising a plurality of vertices and at least one source vertex and at least one target vertex, and a plurality of edges therebetween, each of the plurality of edges being constrained by a maximum amount of flow that can be transported thereover, the graph being further characterized by a flow comprising a plurality of preflow. As described above, the graph may be representative of, or derived from, a multi-dimensional image, such as a multi-dimensional biomedical image obtained from an imaging modality or PACS.

In one embodiment, the method begins with dividing the graph into a plurality of regions, each of the plurality of regions including a subset of the plurality of vertices, including a regional source vertex and a regional target vertex, and an associated subset of the plurality of edges (block 202). Alternatively, the method may begin with obtaining a multi-dimensional image and deriving the graph therefrom prior to dividing the graph (block 218). The subset of the plurality of vertices comprises at least one boundary vertex which includes the regional source vertex, the regional target vertex, or a combination thereof.

In one embodiment, a first amount of memory required to process the graph may be determined along with determination of a second amount of memory less than the first amount; and wherein the dividing further divides the graph into a plurality of regions, each of the plurality of regions requiring at most the second amount of memory for processing. Where the first amount of memory may exceed a physical memory space, virtual memory space, or combination thereof of a computer executing one of the dividing, identifying, processing, skipping, computing, or combination thereof, the second amount of memory may be determined so as not exceed the physical memory space, virtual memory space, or combination thereof of the computer. In one embodiment, the second amount of memory may be less than or equal to a page size, block size, or combination thereof of a storage architecture of a computer executing one of the dividing, identifying, processing, skipping, computing, or combination thereof. Generally, the second amount of memory should be an amount of memory determined to be more computationally efficient than the first amount of memory.

The method further includes identifying each region of the plurality of regions having at least a portion of the plurality of preflow (block 204). The identifying may first select a region of the plurality of regions having at least a portion of the plurality of preflow close to one of the source vertices of the graph.

For each identified region and for all of the portion of the plurality of preflow and for all of the subset of the plurality of vertices of the identified region, processing the identified region (block 206) by alternating between a pushing phase and a region relabel operation. In particular, the method includes: transporting the portion of the plurality of preflow between neighboring vertices of the subset of the plurality of vertices of the identified region via an edge of the subset of the plurality of edges of the identified region (block 208); determining a degree to which the edge is saturated and determining, based on the degree of saturation of the edge, a direction in which subsequent preflow should be transported between the neighboring vertices via the edge (block 210); and terminating the transporting and determining when all of the portion of the plurality of preflow of the identified region has reached the regional target vertex of the identified region, retreated to the regional source vertex of the identified region, or a combination thereof (block 212). Processing another of the plurality of regions having at least a portion of the plurality of preflow may be done independently of the identified region, such as by processing another region substantially in parallel, in separately allocated memory space, utilizing a separate process, utilizing a separate processor, or combinations thereof.

The method further includes skipping each region of the plurality of regions which have none of the plurality of preflow (block 214).

The processing and skipping are repeated until each of the plurality of preflow has either retreated to the at least one source vertex or moved to the at least one target vertex. Once this occurs, the process is complete and the maximum flow may be computed (block 216).

Figure 3A:
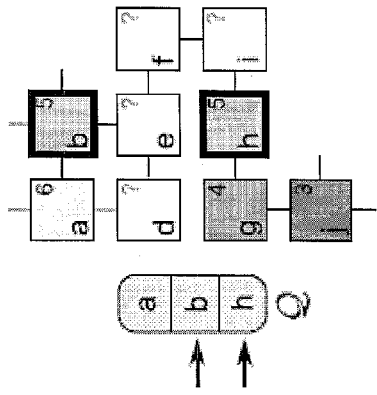
FIGS. 3A-3F depict an example of the region relabeling procedure, according to one embodiment, within a given region using the priority queue.
Figure 3B:
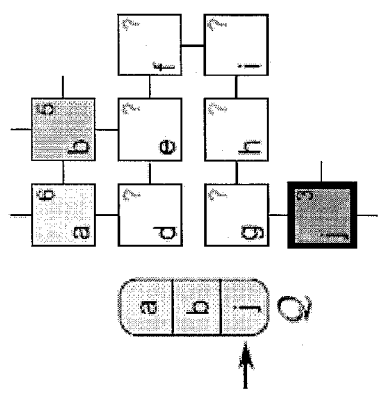
Figure 3C:
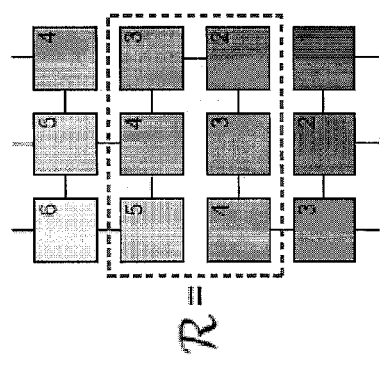
Figure 3D:
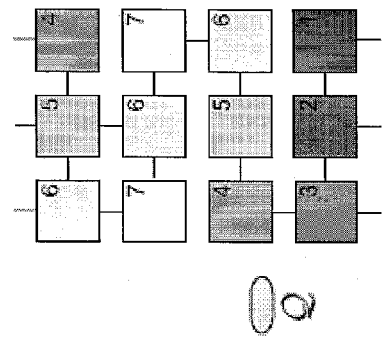
Figure 3E:
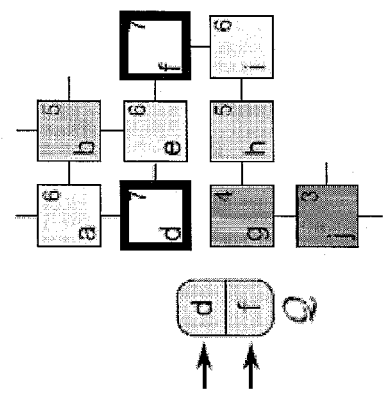
Figure 3F:
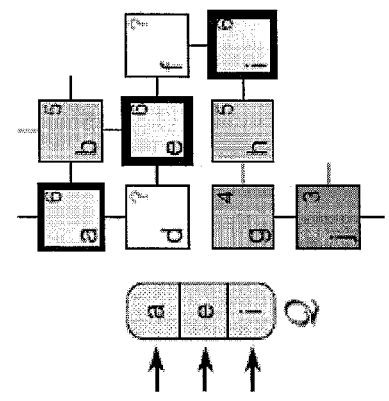

FIGS. 3A-3F show the steps to perform a region relabel on vertices R shown in FIG. 3A. Like global relabeling, a moving front F (portrayed with a heavy border) is propagated throughout R except that, due to Q, vertices in B will automatically activate and join F when their label is reached, as shown in FIG. 3C and FIG. 3D. The algorithm starts by initializing a region R, and a boundary set {a,b,j} in the queue Q. Since j has only 1 neighbor, g, in R, g is updated with its distance label of value 4 based on its relationship to j (FIG. 3B). The next distance value from 4 is 5; hence, b and h will be pulled next since the value of b was known and h can only carry the value 5 since it has no other boundary neighbors (as oppose to the case for d). The neighbors of b and h are then inserted into Q. In FIG. 3D, the next items in the queue are pulled. In this case, a, e and i all belongs with the distance value 6 and are labeled accordingly. Finally, d and f are correctly labeled with the distance value 7. FIG. 3F shows the final label of this region.

FIG. 4A shows a sample segmentation of a lung image using the region based maximum flow segmentation approach. The region is traversed starting at the source location and progress towards the sinks according to the region based maximum flow. Note that not all parts of the image beyond the sink locations are required to be visited by the preflow, as illustrated by FIG. 4B. In the same manner, the entire image is not required to be loaded into memory to achieve the correct segmentation as highlighted in the regions in FIG. 4C. The result of this method is that not only does it enable the application of maximum flow segmentation of large data while preserving high quality results, it can also speed up the processing time due to the reduction of data access.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

It is therefore intended that the foregoing detailed description be regarded as illustrative rather than limiting, and that it be understood that it is the following claims, including all equivalents, that are intended to define the spirit and scope of this invention.

We claim:

1. A method of computing maximum flow of a graph, used in image segmentation, the graph comprising a plurality of vertices and at least one source vertex and at least one target vertex, and a plurality of edges therebetween, each of the plurality of edges being constrained by a maximum amount of flow that can be transported thereover, the graph being further characterized by a flow comprising a plurality of preflow, the method comprising:

dividing the graph into a plurality of regions, each of the plurality of regions including a subset of the plurality of vertices, including a regional source vertex and a regional target vertex, and an associated subset of the plurality of edges;

identifying each region of the plurality of regions having at least a portion of the plurality of preflow and, for each identified region and for all of the portion of the plurality of preflow and for all of the subset of the plurality of vertices of the identified region, processing the identified region by:

transporting the portion of the plurality of preflow between neighboring vertices of the subset of the plurality of vertices of the identified region via an edge of the subset of the plurality of edges of the identified region;

determining a degree to which the edge is saturated and determining, based on the degree of saturation of the edge, a direction in which subsequent preflow should be transported between the neighboring vertices via the edge; and terminating the transporting and determining when all of the portion of the plurality of preflow of the identified region has reached the regional target vertex of the identified region, retreated to the regional source vertex of the identified region, or a combination thereof; and wherein the method further comprises:

skipping each region of the plurality of regions which have none of the plurality of preflow; and computing, using one or more processors, the maximum flow once all of the plurality of regions have been identified or skipped.

2. The method of claim 1 wherein the identifying further comprises selecting first a region of the plurality of regions having at least a portion of the plurality of preflow close to the source vertex.

3. The method of claim 1 further comprising processing another of the plurality of regions having at least a portion of the plurality of preflow independently of the identified region.

4. The method of claim 3, further comprising processing the other of the plurality of regions having at least a portion of the plurality of preflow substantially in parallel with the processing of the identified region.

5. The method of claim 3, further comprising processing the other of the plurality of regions having at least a portion of the plurality of preflow using a separate memory space from a memory space allocated for the processing of the identified region.

6. The method of claim 3, further comprising processing the other of the plurality of regions having at least a portion of the plurality of preflow using a first processor different from a second processor processing the identified region.

7. The method of claim 1 further comprising repeating the processing and skipping until each of the plurality of preflow has either retreated to the at least one source vertex or moved to the at least one target vertex.

8. The method of claim 1 further comprising:

determining a first amount of memory required to process the graph; and determining a second amount of memory less than the first amount; and wherein the dividing further comprises dividing the graph into a plurality of regions, each of the plurality of regions requiring at most the second amount of memory for processing.

9. The method of claim 8 wherein the first amount of memory may exceed a physical memory space, virtual memory space, or combination thereof of a computer executing one of the dividing, identifying, processing, skipping, computing, or combination thereof, and further wherein the second amount of memory does not exceed the physical memory space, virtual memory space, or combination thereof of the computer.

10. The method of claim 8 wherein the second amount of memory is less than or equal to a page size, block size, or combination thereof of a storage architecture of a computer executing one of the dividing, identifying, processing, skipping, computing, or combination thereof.

11. The method of claim 8 wherein the second amount of memory comprises an amount of memory determined to be more computationally efficient than the first amount of memory.

12. The method of claim 1 wherein the graph is representative of a multi-dimensional image.

13. The method of claim 1 further comprising obtaining a multi-dimensional image and deriving the graph therefrom.

14. The method of claim 1 wherein the processing further comprises alternating between a pushing phase and a region relabel operation.

15. The method of claim 1 wherein the subset of the plurality of vertices comprises at least one boundary vertex which includes the regional source vertex, the regional target vertex, or a combination thereof.

16. An apparatus for computing maximum flow of a graph, used in image segmentation, the graph comprising a plurality of vertices and at least one source vertex and at least one target vertex, and a plurality of edges therebetween, each of the plurality of edges being constrained by a maximum amount of flow that can be transported thereover, the graph being further characterized by a flow comprising a plurality of preflow, the apparatus comprising:

memory coupled to one or more processors;

a graph divider that divides the graph into a plurality of regions, each of the plurality of regions including a subset of the plurality of vertices, including a regional source vertex and a regional target vertex, and an associated subset of the plurality of edges;

a region identifier, coupled with the graph divider, that identifies each region of the plurality of regions having at least a portion of the plurality of preflow;

a region processor coupled with the region identifier that, for each identified region and for all of the portion of the plurality of preflow and for all of the subset of the plurality of vertices of the identified region, processes the identified region, the region processor including:

a preflow transporter that transport the portion of the plurality of preflow between neighboring vertices of the subset of the plurality of vertices of the identified region via an edge of the subset of the plurality of edges of the identified region;

an edge analyzer coupled with the preflow transporter that determines a degree to which the edge is saturated and determine, based on the degree of saturation of the edge, a direction in which subsequent preflow should be transported between the neighboring vertices via the edge; and a preflow terminator coupled with the preflow transporter and edge analyzer that terminates the transport of preflow by the preflow transporter and determination of edge saturation and preflow direction by the edge analyzer when all of the portion of the plurality of preflow of the identified region has reached the regional target vertex of the identified region, retreated to the regional source vertex of the identified region, or a combination thereof; and wherein the apparatus further comprises:
- a region skipper coupled with the region identifier that ignores each region of the plurality of regions which have none of the plurality of preflow; and
- a maximum flow processor coupled with the region identifier, region processor and region skipper that computes the maximum flow once all of the plurality of regions have been identified or skipped.

17. The apparatus of claim 16 wherein the region identifier further selects first a region of the plurality of regions having at least a portion of the plurality of preflow close to the source vertex.

18. The apparatus of claim 16 wherein the region processor further processes another of the plurality of regions having at least a portion of the plurality of preflow independently of the identified region.

19. The apparatus of claim 18, wherein the region processor further processes the other of the plurality of regions having at least a portion of the plurality of preflow substantially in parallel with the identified region.

20. The apparatus of claim 18, wherein the region processor further processes the other of the plurality of regions having at least a portion of the plurality of preflow using a separate memory space from a memory space allocated for the identified region.

21. The apparatus of claim 18, wherein the region processor further processes the other of the plurality of regions having at least a portion of the plurality of preflow using a first processor different from a second processor which processes the identified region.

22. The apparatus of claim 16 wherein the region identifier, region processor and region skipper further process all of the plurality of regions until each of the plurality of preflow has either been moved to the at least one source vertex or moved to the at least one target vertex.

23. The apparatus of claim 16 wherein the graph divider further determines a first amount of memory required to process the graph, determine a second amount of memory less than the first amount; and divide the graph into a plurality of regions, where each of the plurality of regions requires at most the second amount of memory for processing.

24. The apparatus of claim 23 wherein the first amount of memory may exceed a physical memory space, virtual memory space, or combination thereof of a computer comprising the graph divider, region identifier, region processor, region skipper, maximum flow processor, or combinations thereof, and further wherein the second amount of memory does not exceed the physical memory space, virtual memory space, or combination thereof of the computer.

25. The apparatus of claim 23 wherein the second amount of memory is less than or equal to a page size, block size, or combination thereof of a storage architecture of a computer comprising the graph divider, region identifier, region processor, region skipper, maximum flow processor, or combinations thereof.

26. The apparatus of claim 23 wherein the second amount of memory comprises an amount of memory determined to be more computationally efficient than the first amount of memory.

27. The apparatus of claim 16 wherein the graph is representative of a multi-dimensional image.

28. The apparatus of claim 16 further comprising an image processor that obtains a multi-dimensional image and derive the graph therefrom.

29. The apparatus of claim 16 wherein the region processor that alternates between a pushing phase and a region relabel operation.

30. The apparatus of claim 16 wherein the subset of the plurality of vertices comprises at least one boundary vertex which includes the regional source vertex, the regional target vertex, or a combination thereof.

31. A system for computing maximum flow of a graph, used in image segmentation, the graph comprising a plurality of vertices and at least one source vertex and at least one target vertex, and a plurality of edges therebetween, each of the plurality of edges being constrained by a maximum amount of flow that can be transported thereover, the graph being further characterized by a flow comprising a plurality of preflow, the system comprising:
- means for dividing the graph into a plurality of regions, each of the plurality of regions including a subset of the plurality of vertices, including a regional source vertex and a regional target vertex, and an associated subset of the plurality of edges;
- means for identifying each region of the plurality of regions having at least a portion of the plurality of preflow;
- means for processing, for each identified region and for all of the portion of the plurality of preflow and for all of the subset of the plurality of vertices of the identified region, the identified region, the means for processing including:
  - means for transporting the portion of the plurality of preflow between neighboring vertices of the subset of the plurality of vertices of the identified region via an edge of the subset of the plurality of edges of the identified region;
  - means for determining a degree to which the edge is saturated and determining, based on the degree of saturation of the edge, a direction in which subsequent preflow should be transported between the neighboring vertices via the edge; and
  - means for terminating the transporting and determining when all of the portion of the plurality of preflow of the identified region has reached the regional target vertex of the identified region, retreated to the regional source vertex of the identified region, or a combination thereof; and wherein the system further comprises:
- means for skipping each region of the plurality of regions which have none of the plurality of preflow; and
- means for computing the maximum flow once all of the plurality of regions have been identified or skipped.

* * * * *